United States Patent
Ito et al.

(10) Patent No.: US 11,095,712 B2
(45) Date of Patent: Aug. 17, 2021

(54) COMPUTER SYSTEM AND CONTROL METHOD FOR DATA TRANSFER

(71) Applicant: HITACHI, LTD., Tokyo (JP)

(72) Inventors: Daisuke Ito, Tokyo (JP); Shinichiro Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/021,083

(22) Filed: Sep. 15, 2020

(65) Prior Publication Data
US 2021/0227021 A1    Jul. 22, 2021

(30) Foreign Application Priority Data
Jan. 21, 2020 (JP) .............................. JP2020-007467

(51) Int. Cl.
*G06F 15/173* (2006.01)
*H04L 29/08* (2006.01)

(52) U.S. Cl.
CPC .............................. *H04L 67/1002* (2013.01)

(58) Field of Classification Search
CPC ..... H04L 67/1002; H04L 45/00; H04L 29/06; H04L 29/08072
USPC ........................................................ 709/238
See application file for complete search history.

(56) References Cited

U.S. PATENT DOCUMENTS

| | | | | |
|---|---|---|---|---|
| 6,631,137 B1 * | 10/2003 | Lorrain | ............... | H04L 12/4637 370/401 |
| 8,009,554 B2 * | 8/2011 | Chin | ....................... | H04L 45/22 370/216 |
| 8,601,155 B2 * | 12/2013 | Toombs | ................ | H04L 45/121 709/238 |
| 8,825,872 B2 * | 9/2014 | Reisman | ............ | G06Q 30/0623 709/227 |
| 10,142,394 B2 * | 11/2018 | Chmielewski | ...... | H04L 12/2809 |
| 2001/0029520 A1 * | 10/2001 | Miyazaki | ................ | H04L 67/06 709/200 |
| 2003/0025902 A1 * | 2/2003 | Hedges | ..................... | G01S 1/54 356/141.4 |
| 2004/0024900 A1 * | 2/2004 | Breiter | .................. | H04L 65/602 709/231 |

(Continued)

FOREIGN PATENT DOCUMENTS

| | | |
|---|---|---|
| JP | 2013-089055 A | 5/2013 |
| WO | 2015/011840 A1 | 1/2015 |

*Primary Examiner* — Razu A Miah
(74) *Attorney, Agent, or Firm* — Volpe Koenig

(57) ABSTRACT

A computer system for controlling data linkage achieves higher rate data transfer between a first system that performs operations and a second system that acquires data regarding the operations reduces influence on the operations and between the systems. The first system includes a storage unit that manages resources storing data and a control unit that controls data transfer and the second system includes a data acquisition unit. The control unit calculates cost that represents a load of the first system with respect to each of multiple data transfer schemes, determines an applicable data transfer scheme based on the cost, and notifies the second system of that scheme. The data acquisition unit manages states associated with the determined data transfer scheme and sends a request to acquire data from resources based on the determined data transfer scheme and the states.

10 Claims, 14 Drawing Sheets

(56) References Cited

U.S. PATENT DOCUMENTS

| | | | | |
|---|---|---|---|---|
| 2007/0097979 A1* | 5/2007 | V. | ............... | H04L 41/5009 370/392 |
| 2008/0306800 A1* | 12/2008 | Liu | ............... | G06Q 10/06 705/7.15 |
| 2010/0121910 A1* | 5/2010 | Kim | ............... | H04L 47/125 709/203 |
| 2010/0235285 A1* | 9/2010 | Hoffberg | ............... | G06Q 20/401 705/75 |
| 2010/0329248 A1* | 12/2010 | Eggert | ............... | H04L 69/326 370/389 |
| 2011/0142055 A1* | 6/2011 | Feder | ............... | H04L 29/08792 370/400 |
| 2013/0151664 A1* | 6/2013 | Miyao | ............... | H04L 45/00 709/217 |
| 2016/0117770 A1* | 4/2016 | Graham | ............... | G06Q 40/04 705/37 |
| 2017/0060633 A1* | 3/2017 | Suarez Gracia | ............... | G06F 9/505 |
| 2019/0028374 A1* | 1/2019 | Xu | ............... | H04L 45/64 |

* cited by examiner

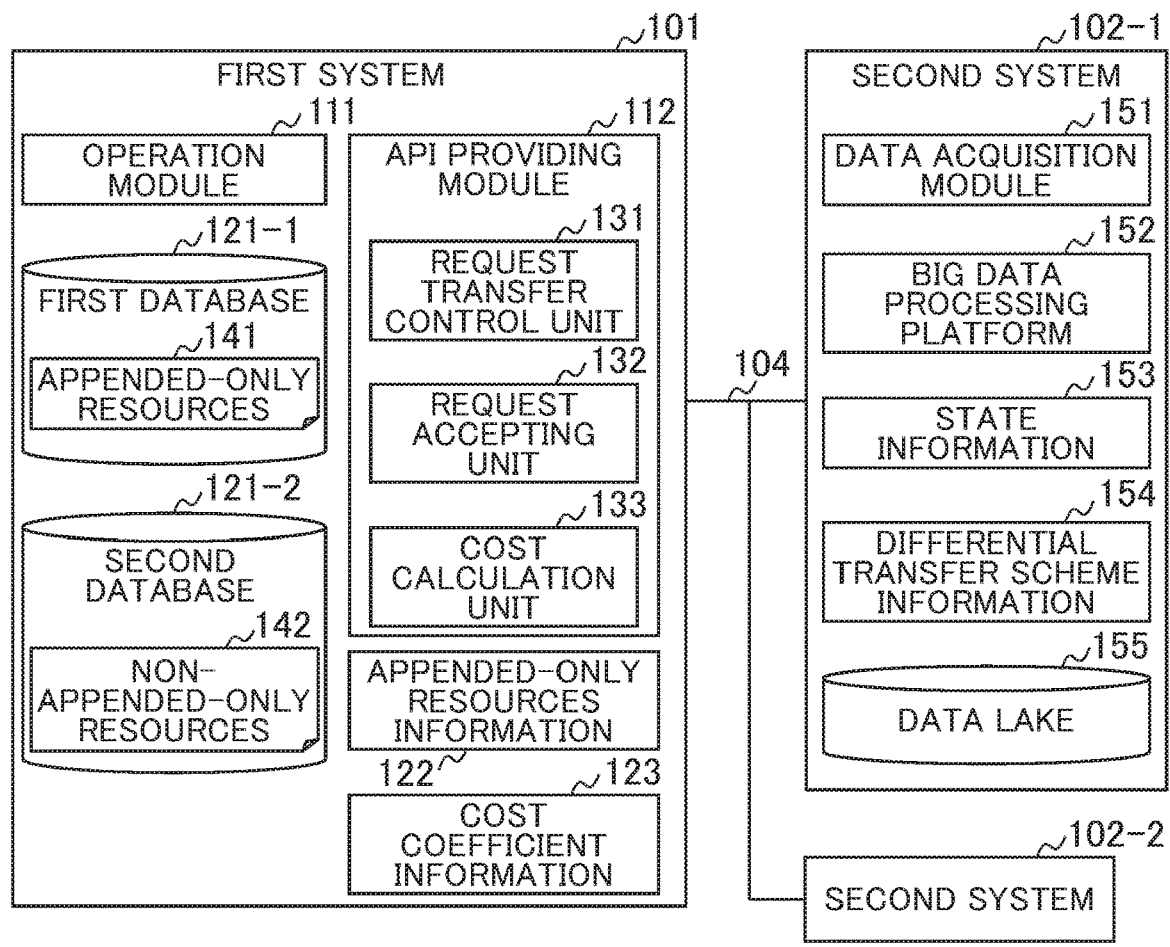
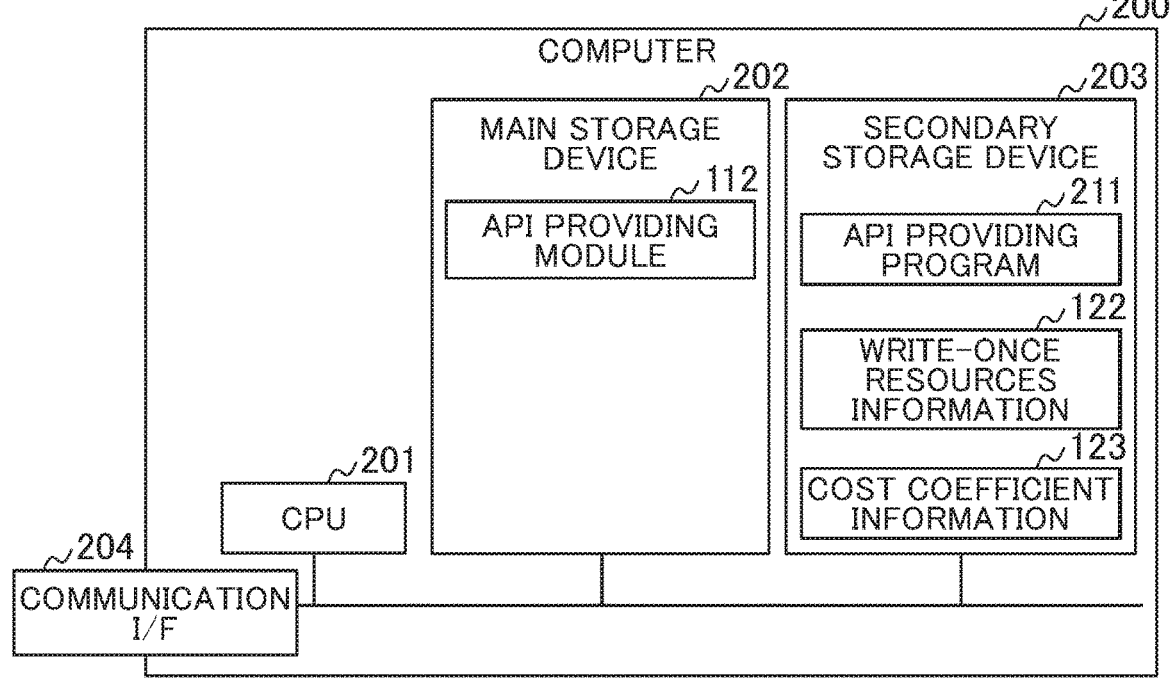

FIG. 17

```
//HANDLING OF BATCH TRANSFER
//no_restriction:UNRESTRICTED TRANSFER OF BATCH
//slow:BATCH IS TRANSFERRED IN SMALL AMOUNTS DEPENDING ON SYSTEM LOADS
//deny:BATCH TRANSFER IS REJECTED IN PRINCIPLE
bulk_mode = {no_restriction| slow | deny};
```

1700

COMPUTER SYSTEM AND CONTROL METHOD FOR DATA TRANSFER

CLAIM OF PRIORITY

The present application claims priority from Japanese patent application JP 2020-7467, filed on Jan. 21, 2020, the content of which is hereby incorporated by reference into this application.

BACKGROUND

The present invention relates to a data transfer technology regarding data linkage between systems.

Along with development of Internet of Things (IoT), there is an emerging service that provides a value-added solution by analyzing data collected from devices such as sensors.

There is an increasing need for data linkage to make system-internal databases which have so far been undisclosed open to and usable by an external system. One typical way of implementing data linkage is installing an Application Program Interface (API) server within a closed system and carrying out data linkage between that system and an external system via the API server. Desirably, such API server should use a low amount of resources so as not to interfere with ordinary operations of the closed system.

As a publicly known technology for saving the usage of resources on the API server when data linkage is performed, there are technical approaches described in Published PCT International Application No. 2015/011840 and Japanese Unexamined Patent Application Publication No. 2013-89055.

In Published PCT International Application No. 2015/011840, there is a description as follows, "data that is requested to be transferred is split into multiple data segments and multiple sending devices are queried as to whether or not they have each data segment by sending them a hash value of the data segment".

In Japanese Unexamined Patent Application Publication No. 2013-89055, there is a description as follows, "a relay device at a sending side monitors conditions of access to an operation server at the sending side from terminals and controls sending of download data based on a result of monitoring".

SUMMARY

However, in a method described in Published PCT International Application No. 2015/011840, the API server needs to manage states, each being indicative of the state of a data segment transferred to each external system. Because of this, memory consumption increases, performance deteriorates, and consequent interference with operations of the closed system cannot be eliminated. It should be noted that data segments are herein referred to as chunks. Besides, in a method described in Japanese Unexamined Patent Application Publication No. 2013-89055, interference with the operations is eliminated, but there is a decrease in the data transfer rate in conjunction with data linkage.

In data linkage between a system that performs operations and a system that acquires data from the foregoing system, the present invention is intended to provide a system and a method that reduce influence on the operations and achieve higher rate data transfer between the systems.

One example representative of the invention disclosed herein is set forth as follows: a computer system adapted to control data transfer between multiple systems comprising computers, each having an arithmetic unit, a storage device being connected to the arithmetic unit, and a networking device being connected to the arithmetic unit, the multiple systems including a first system that performs operations and a second system that acquires data regarding the operations. The first system includes a storage unit that manages resources storing the data and a control unit that controls transfer of the data to the second system based on any one of multiple data transfer schemes and the second system includes a data acquisition unit that acquires the data from the resources. The control unit, upon accepting a query of a data transfer scheme for a target resource from the data acquisition unit, calculates cost that represents a load of the first system with respect to each of the multiple data transfer schemes, determines an applicable data transfer scheme based on the cost, and sends information on the determined data transfer scheme to the second system. The data acquisition unit manages states that are information for managing a data transfer state and for use in data transfer based on the determined data transfer scheme and sends a request to acquire the data from the resources based on the determined data transfer scheme and the states.

According to the present invention, in data linkage between a system that performs operations and a system that acquires data from the foregoing system, it is possible to reduce influence on the operations and achieve higher rate data transfer between the systems. Problems, configurations, and advantageous effects other than described above will be made apparent from the following description of embodiments.

BRIEF DESCRIPTION OF THE DRAWINGS

FIG. 1 is a diagram depicting an example of a configuration of a computer system of a first embodiment.

FIG. 2 is a diagram depicting an example of a configuration to implement an API providing module in the first embodiment.

FIG. 17 is a diagram to explain setup information that is retained by a first system in the second embodiment.

DETAILED DESCRIPTION

Figures 3, 4, 5:
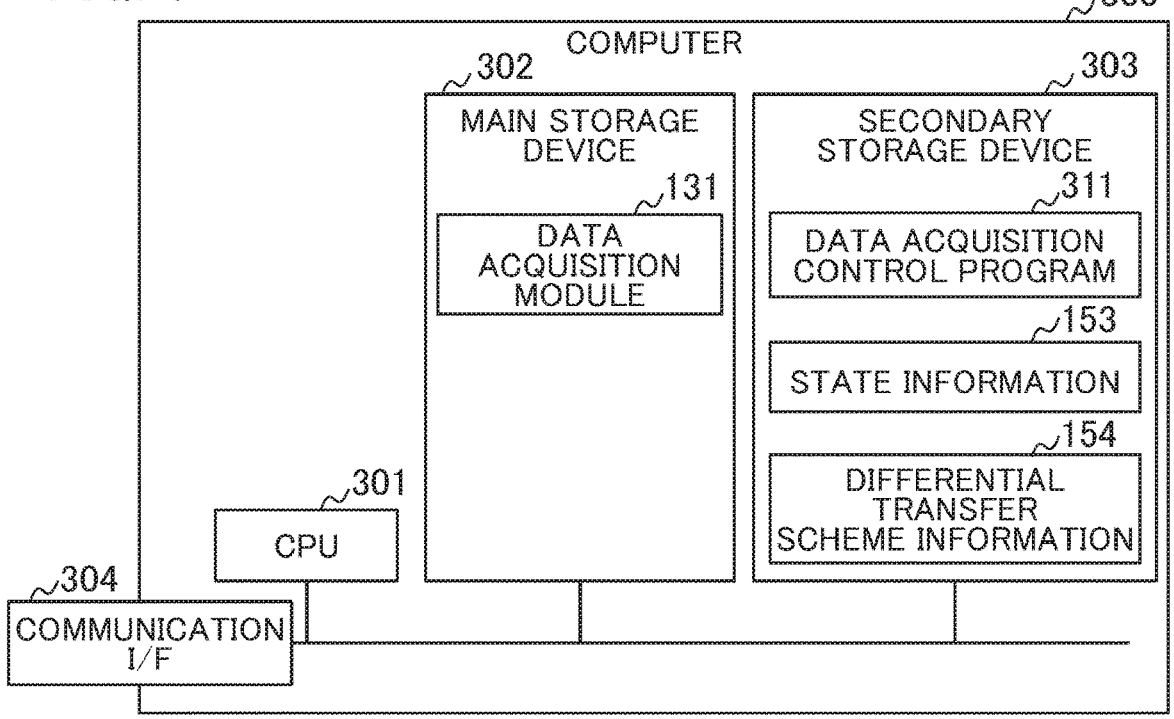
FIG. 3 is a diagram depicting an example of a configuration to implement a data acquisition module in the first embodiment.
FIG. 4 is a diagram to explain detail of a data structure of append-only resources information in the first embodiment.
FIG. 5 is a diagram to explain detail of a data structure of cost coefficient information in the first embodiment.

In the following, embodiments of the present invention will be described with the aid of the drawings. However, the present invention should not be construed to be limited to the following description of the embodiments. Those skilled in the art will easily appreciate that a concrete configuration of the present invention may be modified without departing from the idea or spirit of the invention.

In a configuration of the present invention which will be described hereinafter, identical or similar components or functions are assigned identical reference numerals and duplicated description thereof is dispensed with.

Notation of "first", "second", "third", etc. herein is prefixed to identify components, but it is not necessarily intended to qualify a number or a sequence.

In some cases, the position, size, shape, range, etc. of each component depicted in a drawing or the like may not represent its actual position, size, shape, range, etc. with the intention to facilitate understanding of the invention. Hence, in the present invention, there is no limitation to a position, size, shape, range, etc. disclosed in a drawing or the like.

First Embodiment

FIG. 1 is a diagram depicting an example of a configuration of a computer system of a first embodiment.

The computer system of the first embodiment is comprised of a first system that performs operations and two second systems 102-1, 102-2 that are independent of the first system 101 and will acquire data regarding operations. In the following description, we write down a second system 102, where it is not necessary to individuate the second systems 102-1, 102-2. The first system 101 and each second system 102 are interconnected via a network 104, such as a Local Area Network (LAN) and a Wide Area Network (WAN).

Note that two or more first systems 101 may be included in the computer system. Also, a single second system 102 or third or more second systems 102 may be included in the computer system.

The first system 101 has an operation module 111 and an API providing module 112 and manages databases 121-1, 121-2. Also, the first system 101 retains append-only resources information 122 and cost coefficient information 123.

The operation module 111 performs various processing tasks for implementing operations of the first system 101.

Databases 121-1, 121-2 store resources. In the databases 121-1, 121-2, resources for which formats of storing data differ by type of resources are stored. The resources here refer to, inter alia, tables and files storing data regarding operations. In the following description, we write down a database 121, where it is not necessary to individuate the databases 121-1, 121-2.

A database 121-1 stores append-only resources 141. The append-only resources 141 here are resources that are managed in a way that stored data itself is not updated. If the database 121-1 is RDB, the append-only resources 141 are tables on which INSERT is only executed, but UPDATE and DELETE are not executed.

A database 121-2 stores non-append-only resources 142. The non-append-only resources 142 here are resources that are managed in a way that stored data itself can be updated. If the database 121-2 is RDB, the non-append-only resources 142 are tables on which UPDATE and DELETE can be executed.

The API providing module 112 provides the API to access a database 121 to the second system 102. The API providing module 112 includes a request transfer control unit 131, a request accepting unit 132, and a cost calculation unit 133. Detail of the API providing module 112 will be described with FIG. 2.

The append-only resources information 122 is information for managing append-only resources 141. Detail of a data structure of the append-only resources 141 will be described with FIG. 4. The cost coefficient information 123 is information for managing a cost coefficient that is used by the cost calculation unit 133 in calculating cost. Detail of a data structure of the cost coefficient information 123 will be described with FIG. 5.

Each second system 102 has a data acquisition module 151 and a big data processing platform 152 and manages a data lake 155. Also, the second system 102 retains state information 153 and differential transfer scheme information 154.

The data acquisition module 151 acquires data regarding operations from the first system 101. Detail of the data acquisition module 151 will be described with FIG. 3.

The big data processing platform 152 carries out storing data received from the first system 101 and data processing using that data.

The state information 153 is information for managing a data transfer state. When there are multiple systems to acquire data, a second system 102 retains as many pieces of state information 153 as the number of the systems. Detail of the state information 153 will be described with FIG. 6.

The differential transfer scheme information 154 is information for managing a data transfer scheme in which a differential transfer of data from resources is carried out. In the differential transfer scheme information 154, a value indicating either a time-series differential type or a chunk type is stored.

FIG. 2 is a diagram depicting an example of a configuration to implement the API providing module 112 in the first embodiment.

The API providing module 112 is implemented by a computer 200 that is equipped with a CPU 201, a main storage device 202, a secondary storage device 203, and a communication interface 204. Note that the API providing module 112 may be implemented using multiple computers 200. Additionally, the hardware configuration of the computer 200 is exemplary and no limitation to this is intended.

The CPU 201 executes a program that is stored in the main storage device 202. The CPU 201 executes processing tasks according to a program and, thereby, the computer operates as a module that implements specific functionality. In the following description, a description of processing that is executed by the diagram exemplifying API description module as a subject implies that the CPU 201 executes a program that implements the module.

The main storage device 202 is a storage device such as a memory and stores a program that is executed by the CPU and related data. Also, the main storage device 202 is used as a working area that the program uses temporarily.

The secondary storage device 203 is a storage device such as a Hard Disk Drive (HDD) and a Solid State Drive (SSD) and stores data permanently.

The communication interface 204 is an interface for communicating with an external device via a network.

As depicted in FIG. 2, the secondary storage device 203 stores an API providing program 211, append-only resources information 122, and cost coefficient information 123.

At startup of the computer 200, the CPU 201 reads the API providing program 211 from the secondary storage device 203 and loads it into the main storage device 202. The CPU 201 executes the API providing program 211 loaded into the main storage device 202, thereby implementing the API providing module 112.

The request transfer control unit 131 controls transfer of data regarding operations to a second system 102. The request accepting unit 132 accepts a request of variety from a second system. The cost calculation unit 133 calculates cost that is used to determine a data transfer scheme.

Note that, as for the respective functional units included in the API providing module 112, plural functional units may be integrated in a single functional unit or one functional unit may be divided into plural functional units per function. For example, the request transfer control unit 131 may include the request accepting unit 132 and the cost calculation unit 133.

FIG. 3 is a diagram depicting an example of a configuration to implement the data acquisition module 151 in the first embodiment.

The data acquisition module 151 is implemented by a computer 300 that is equipped with a CPU 301, a main storage device 302, a secondary storage device 303, and a communication interface 304. Note that the data acquisition module 151 may be implemented using multiple computers 300. Additionally, the hardware configuration of the computer 300 is exemplary and no limitation to this is intended.

The CPU 301, main storage device 302, secondary storage device 303, and communication interface 304 are the same hardware components as the CPU 201, main storage device 202, secondary storage device 203, and communication interface 204; therefore, their description is omitted.

As depicted in FIG. 3, the secondary storage device 303 stores a data acquisition control program 311, state information 153, and differential transfer scheme information 154.

At startup of the computer 300, the CPU 301 reads the data acquisition control program 311 from the secondary storage device 303 and loads it into the main storage device 302. The CPU 301 executes the data acquisition control program 311 loaded into the main storage device 302, thereby implementing the data acquisition module 151.

FIG. 4 is a diagram to explain detail of a data structure of append-only resources information 122 in the first embodiment.

Append-only resources information 122 is information in a table form to store records, each being comprised of ID 401, database name 402, and resource name 403. One record corresponds to one append-only resource 141.

ID 401 is a field to store identifying information to uniquely identify a record in the append-only resources information 122. Database name 402 is a field to store the name of a database 121 that stores an append-only resource 141. Resource name 403 is a field to store the name of the append-only resource 141.

A record whose ID 401 is "1" represents an append-only resource 141 whose name is "cnc_1" being stored in the first database 121-1.

FIG. 5 is a diagram to explain detail of a data structure of cost coefficient information 123 in the first embodiment.

Cost coefficient information 123 is information in a table form to store records, each being comprised of ID 501, database name 502, resource name 503, data transfer scheme 504, and cost coefficient 505. One record corresponds to values of cost coefficient associated with a data transfer scheme defined for a resource.

ID 501 is a field to store identifying information to uniquely identify a record in the cost coefficient information 123. Database name 502 is a field to store the name of a database 121. Resource name 503 is a field to store the name of a resource.

Data transfer scheme 504 is a field to store a value indicating a data transfer scheme. In the field of data transfer scheme 504, either "time-series differential" or "chunk" is stored. Note that a data transfer scheme can be defined on a per resource type basis (append-only resources 141 and non-append-only resources 142).

Cost coefficient 505 is a field with sub-fields to store cost coefficients that are used for calculating cost. The field of cost coefficient 505 includes sub-fields of data amount 506 and the number of records 507. Data amount is a sub-field to store a cost coefficient regarding data amount. The number of records 507 is a sub-field to store a cost coefficient regarding the number of data pieces (records) that are stored in the resource. Note that there may be only a sub-field of either data amount 506 or the number of records 507.

A record whose ID 501 is "1" defines cost coefficients associated with a data transfer scheme "time-series differential" defined for a resource whose name is "cnc_1" that is stored in the first database 121-1. Specifically, a cost coefficient regarding data amount is "4/B" and a cost coefficient regarding the number of records is "9/record".

Note that cost coefficients may be defined with respect to each format of storing data in resources, rather than in units of resources. That is, cost coefficients may be defined for each type of append-only resources 141 and non-append-only resources 142.

Figure 6:
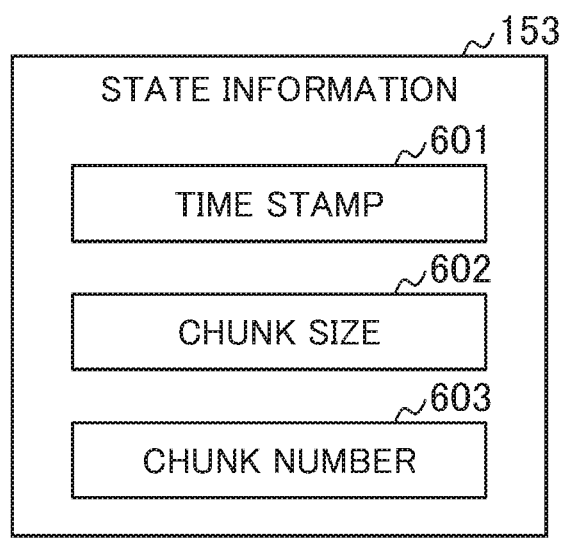
FIG. 6 is a diagram exemplifying state information in the first embodiment.

FIG. 6 is a diagram exemplifying state information 153 in the first embodiment.

State information 153 stores time stamp 601, chunk size 602, and chunk number 603.

Time stamp 601 is data that is used when the data transfer scheme is the time-series differential type. Chunk size 602 and chunk number 603 are data that is used when the data transfer scheme is the chunk type.

Note that the data acquisition module 151 may store either data of time stamp 601 or data of chunk size 602 and chunk number 0603 according to a specified data transfer scheme.

Figure 7:
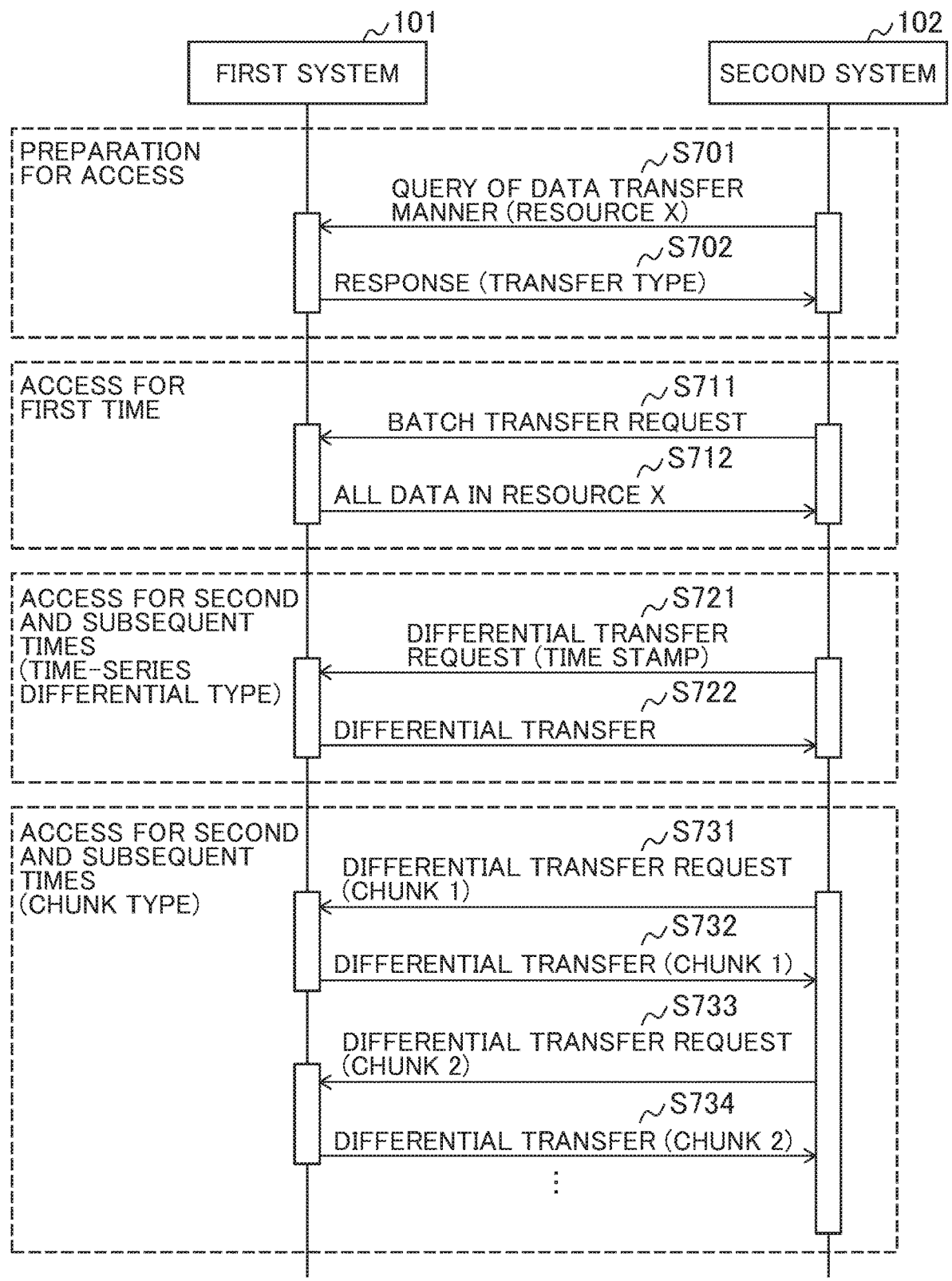
FIG. 7 is a sequence diagram illustrating a general processing flow of data transfer in the computer system of the first embodiment.

FIG. 7 is a sequence diagram illustrating a general processing flow of data transfer in the computer system of the first embodiment.

First, preparation for access is performed to carry out data transfer between the first system 101 and a second system 102.

The second system 102 sends a query of a data transfer scheme for a target resource to access to the first system 101 (step S701). Here, the target resource to access is taken as a resource X. Upon receiving the query, the first system 101 determines the data transfer scheme for the resource X and sends a response including information of the determined data transfer scheme to the second system 102 (step S702).

When accessing the resource X for the first time, processing as below is executed.

The second system 102 sends a batch transfer request for the resource X to the first system 101 (step S711). Upon receiving the batch transfer request, the first system 101 sends all data stored in the resource in a batch to the second system 102 (step S712).

When accessing the resource X for the second and subsequent times, processing differs depending on the data transfer scheme.

When the data transfer scheme is the time-series differential type, the second system 102 sends a differential transfer request including a time stamp (the last update time stamp) to the first system (step S721). Upon receiving the differential transfer request, the first system 101 reads data with time stamps later than the time stamp included in the request from the appropriate database 121 and sends that data to the second system 102 (step S722).

When the data transfer type is the chunk type, the second system 102 sends a differential transfer request including a chunk number (chunk 1) and the chunk size to the first system 101 (step S731). Upon receiving the differential transfer request, the first system 101 reads data as a data chunk specified by the chunk number included in the request from the appropriate database 121 and sends that data to the second system 102 (step S732). Note that the first system 101 may send data as a data chunk specified by the chunk number only if that data has been updated. Thereby, bandwidth consumption of the network between the first system 101 and the second system can be saved.

After receiving the data, the second system sends a differential transfer request including a chunk number (chunk 2) and the chunk size to the first system 101 (step S733). Upon receiving the differential transfer request, the first system 101 reads data as a data chunk specified by the chunk number included in the request from the appropriate database 121 and sends that data to the second system 102 (step S734).

Subsequently, the same processing is executed repeatedly until reaching the last chunk number.

Figure 8:
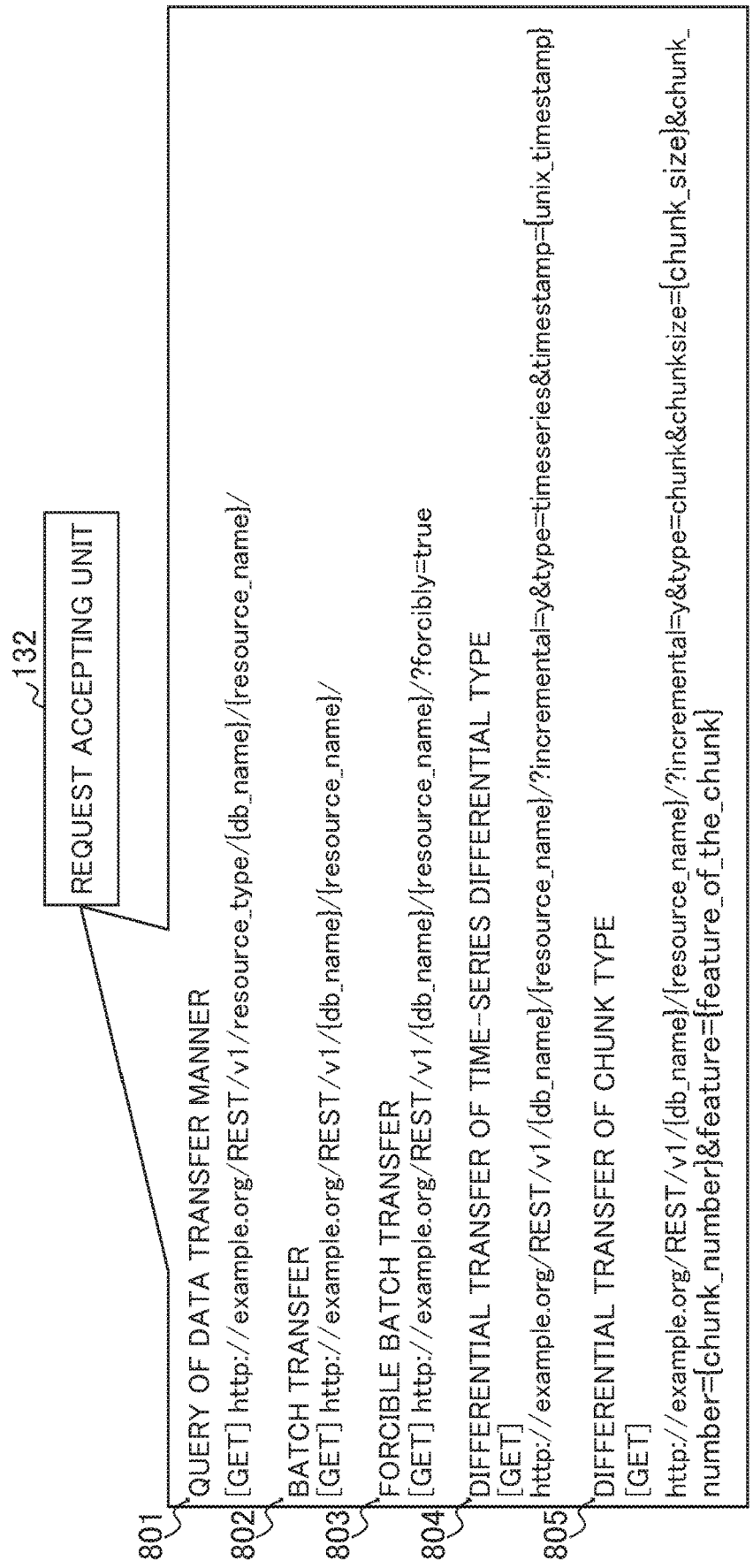
FIG. 8 is a diagram exemplifying API descriptions that are provided by the API providing module in the first embodiment.

FIG. 8 is a diagram exemplifying API descriptions that are provided by the API providing module 112 in the first embodiment.

The request accepting unit 132 of the API providing module 112 provides API descriptions as exemplified in FIG. 8 to the second systems 102. An API description 801 is to implement a query of transfer type. An API description 802 is to implement a bat0 '0ch transfer request. An API description 803 is to implement a forcible batch transfer. An API description 804 is to implement a differential transfer request of the time-series differential type. An API description 805 is to implement a differential transfer request of the chunk type.

Also, the request accepting unit 132 provides information on resources that are provided to a second system 102, such as, e.g., the names of a database 121 and a resource. Note that the names of databases 121 may be managed such that their names for external access are separated from their actual names. Likewise, the names of resources may be managed such that their names for access are separated from their actual names. When the request accepting unit 132 receives a request from a second system 102, it converts the names of a database 121 and a resource included in the request.

Figure 9:
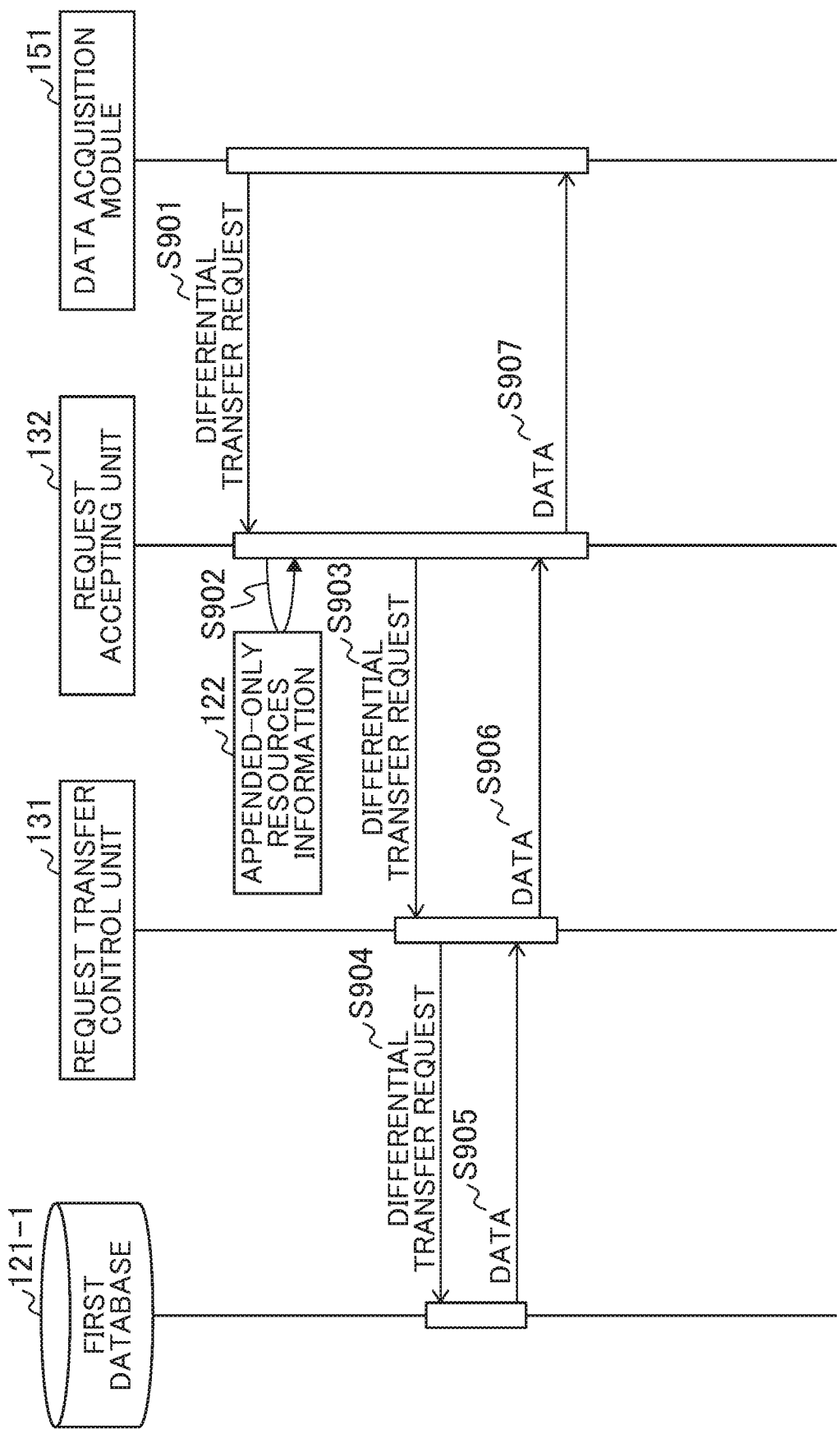
FIG. 9 is a sequence diagram illustrating a processing flow of differential transfer of a time-series differential type in the computer system of the first embodiment.

FIG. 9 is a sequence diagram illustrating a processing flow of differential transfer of the time-series differential type in the computer system of the first embodiment. It is assumed here that data to be transferred is stored in an append-only resource 141 stored in the first database 121-1.

The data acquisition module 151 in a second system 102 sends a differential transfer request of the time-series differential type to the first system 101 (step S901). In the request, the name of a database 121, the name of a resource, and a time stamp (the last update time stamp) are included.

Upon receiving the differential transfer request of the time-series differential type, the request accepting unit 132 in the first system 101 refers to the append-only resources information 122 and searches for a record matched with the names of a database 121 and a resource included in the request (step S902).

If such record exists, the request accepting unit 132 sends the differential transfer request of the time-series differential type to the request transfer control unit 131 (step S903). In the request, the name of a database 121, the name of a resource, and a time stamp (the last update time stamp) are included.

Upon receiving the differential transfer request of the time-series differential type, the request transfer control unit 131 identifies the first database 121-1 that is the target to access by the name of a database 121 included in the request. The request transfer control unit 131 sends the differential transfer request of the time-series differential type including the name of a resource and a time stamp (the last update time stamp) to the first database 121-1 (step S904).

For instance, if the first database 121-1 is RDB, the request transfer control unit 131 sends the differential transfer request of the time-series differential type as below.

SELECT*FROM {resource name} WHERE
    timestamp>{last update time stamp};

Upon receiving the differential transfer request of the time-series differential type, the first database 121-1 reads data with time stamps later than the time stamp included in the request, i.e., differential data from the appropriate append-only resource 141 and sends the read data to the request transfer control unit 131 (step S905).

Upon receiving the data, the request transfer control unit 131 sends that data to the request accepting unit 132 (step S906).

Upon receiving the data, the request accepting unit 132 sends that data to the data acquisition module 151 (step S907).

Figure 10:
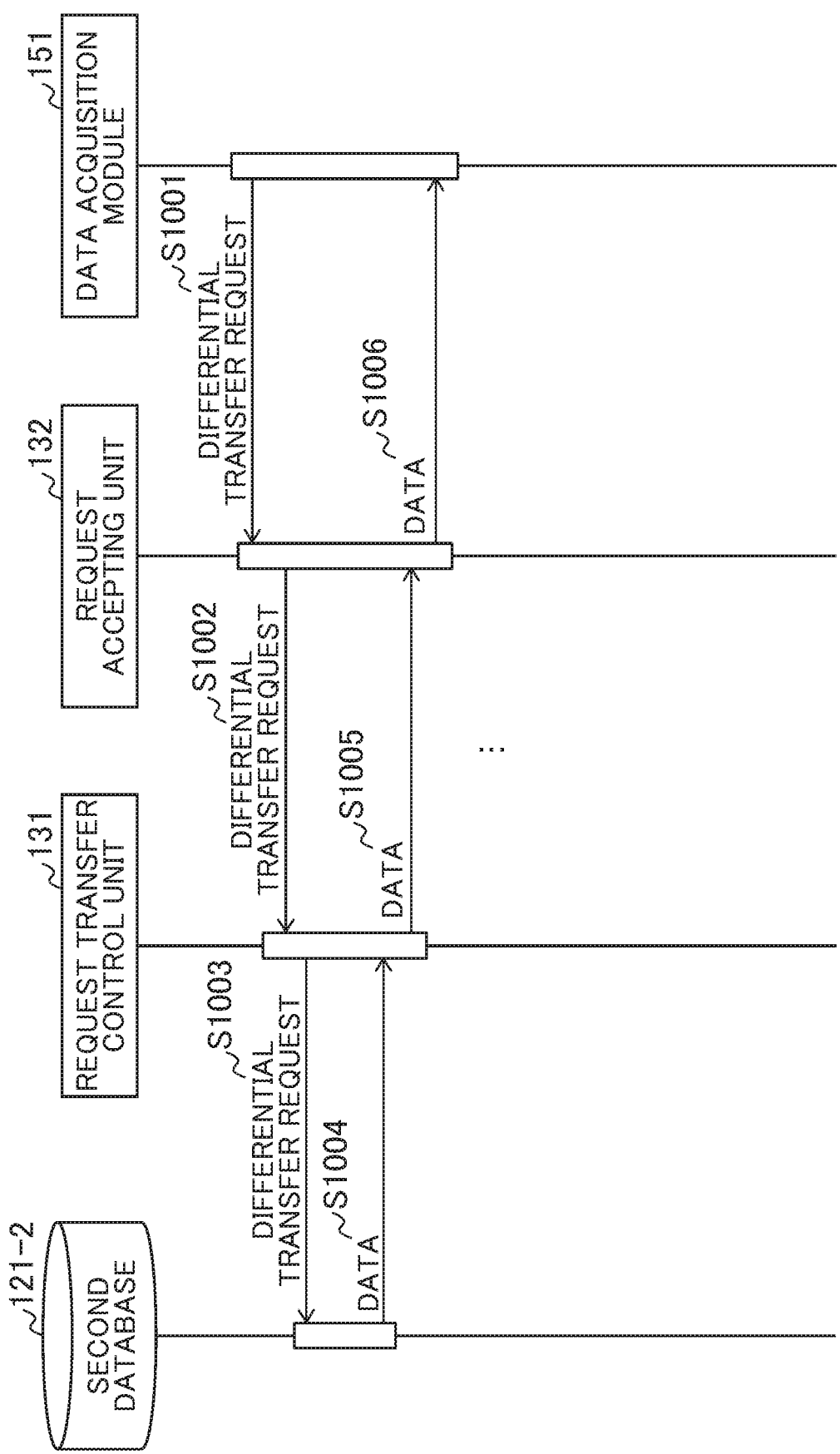
FIG. 10 is a sequence diagram illustrating a processing flow of differential transfer of a chunk type in the computer system of the first embodiment.

FIG. 10 is a sequence diagram illustrating a processing flow of differential transfer of the chunk type in the computer system of the first embodiment. It is assumed here that data to be transferred is stored in a non-append-only resource 142 stored in the second database 121-2.

The data acquisition module 151 in a second system 102 sends a differential transfer request of the chunk type to the first system 101 (step S1001). In the request, the name of a database 121, the name of a resource, chunk size, a chunk number, and a specific feature of the chunk are included. Such specific feature of the chunk is, e.g., a hash value of md5.

Upon receiving the differential transfer request of the chunk type, the request accepting unit 132 sends the differential transfer request of the chunk type to the request transfer control unit 131 (step S1002). In the request, the name of a database 121, the name of a resource, chunk size, a chunk number, and a specific feature of the chunk are included.

Upon receiving the differential transfer request of the chunk type, the request transfer control unit 131 identifies the second database 121-2 that is the target to access by the name of a database 121 included in the request. The request transfer control unit 131 sends the second database 121-2 the differential transfer request of the chunk type based on as follows: the name of a resource, chunk size, a chunk number, and a specific feature of the chunk included in the received request (step S1003).

For instance, if the second database 121-2 is RDB, the request transfer control unit 131 sends the differential transfer request of the chunk type as below.

SELECT*FROM {resource name} LIMIT {chunk size} *({chunk number}−1),{chunk size}*{chunk number};

Upon receiving the differential transfer request of the chunk type, the second database 121-2 reads data in a range that is calculated based on the request, i.e., differential data from the appropriate non-append-only resource 142 and sends the read data to the request transfer control unit 131 (step S1004). For instance, data in a range from a value given by Formula (1) to a value given by Formula (2) is read.
[Formula 1]

$${chunk\ size}*({chunk\ number}-1) \quad (1)$$

[Formula 2]

$${chunk\ size}*{chunk\ number} \quad (2)$$

Upon receiving the data, the request transfer control unit 131 calculates a specific feature of the data chunk, compares the calculated specific feature of the chunk with the specific feature of the chunk included in the once received differential transfer request of the chunk type, thus deciding whether or not the data has been updated. If the data has been updated, the request transfer control unit 131 sends the received data to the request accepting unit 132 (step S1005).

Upon receiving the data, the request accepting unit 132 sends that data to the data acquisition module 151 (step S1006).

Subsequently, the same processing is executed repeatedly until reaching the last chunk number.

Figure 11A:
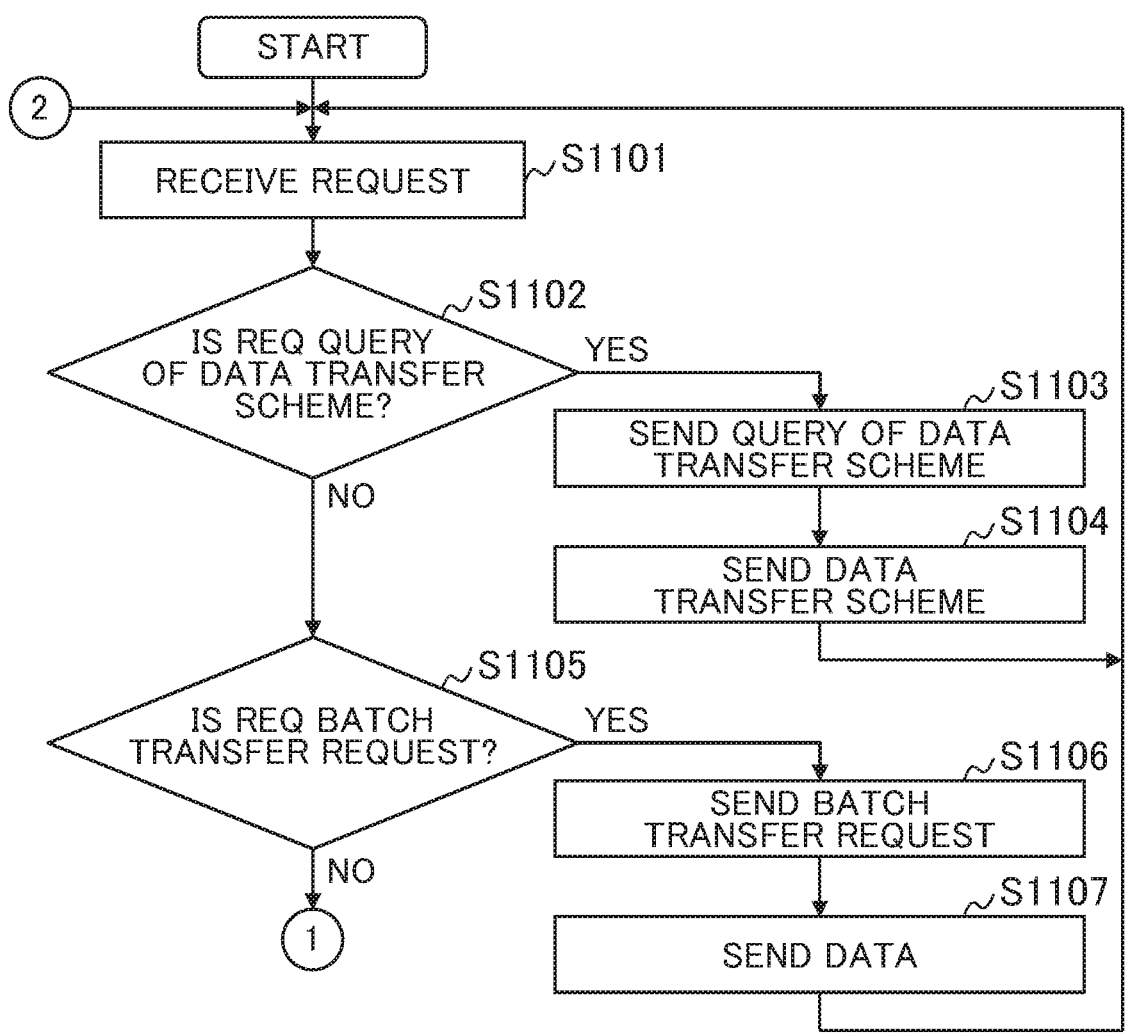
FIG. 11A is a flowchart illustrating processing that is executed by a request accepting unit in the first embodiment.
Figure 11B:
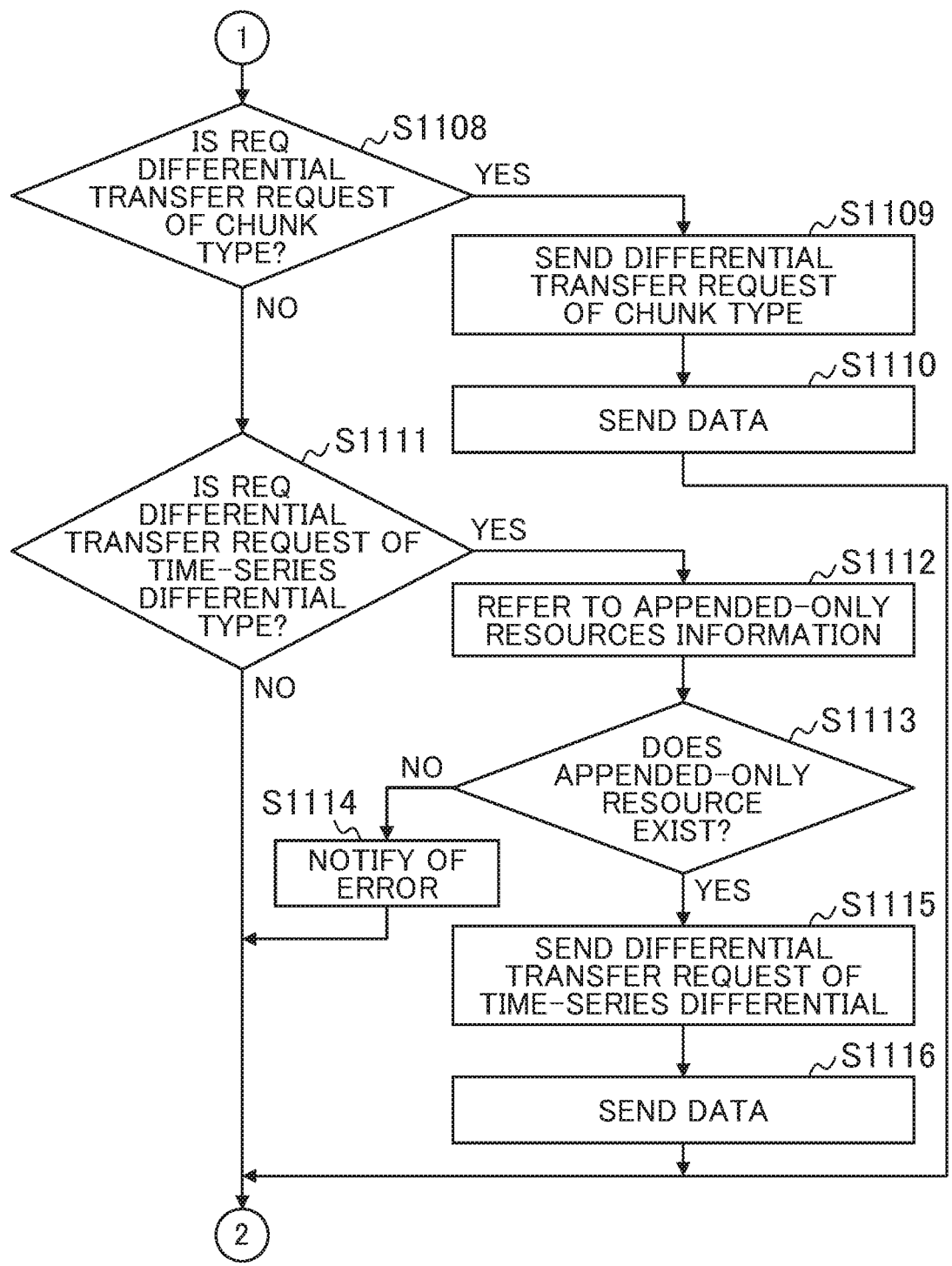
FIG. 11B is a flowchart illustrating processing that is executed by a request accepting unit in the first embodiment.

FIG. 11A and FIG. 11B are flowcharts illustrating processing that is executed by the request accepting unit 132 in the first embodiment.

The request accepting unit 132 in a state of awaiting a request, upon receiving a request from a second system (step S1101), then decides whether or not the request is a query of a data transfer scheme (step S1102).

If the received request is a query of a data transfer scheme, the request accepting unit 132 sends the query of a data transfer scheme to the cost calculation unit 133 (step S1103).

Upon receiving information indicating an appropriate data transfer scheme from the cost calculation unit 133, the request accepting unit 132 sends the second system 102 a response including the information indicating the data transfer scheme (step S1104). Then, the request accepting unit 132 transits into the state of awaiting a request.

If it is decided at step S1102 that the received request is not a query of a data transfer scheme, the request accepting unit 132 decides whether or not the received request is a batch transfer request (step S1105).

If the received request is a batch transfer request, the request accepting unit 132 sends the batch transfer request to the request transfer control unit 131 (step S1106).

Upon receiving appropriate data from the request transfer control unit 131, the request accepting unit 132 sends that data to the second system 102 (step S1107). Then, the request accepting unit 132 transits into the state of awaiting a request.

If it is decided at step S1105 that the received data is not a batch transfer request, the request accepting unit 132 decides whether or not the received request is a differential transfer request of the chunk type (step S1108).

If the received request is a differential transfer request of the chunk type, the request accepting unit 132 sends the differential transfer request of the chunk type to the request transfer control unit 131 (step S1109).

Upon receiving appropriate data from the request transfer control unit 131, the request accepting unit 132 sends that data to the second system 102 (step S1110). Then, the request accepting unit 132 transits into the state of awaiting a request.

If it is decided at step S1008 that the received request is not a differential transfer request of the chunk type, the request accepting unit 132 decides whether or not the received request is a differential transfer request of the time-series differential type (step S1111).

If the received request is not a differential transfer request of the time-series differential type, the request accepting unit 132 transits into the state of awaiting a request.

If the received request is a differential transfer request of the time-series differential type, the request accepting unit 132 refers to the append-only resources information 122 (step S1112) and decides whether or not an append-only resource 141 by the request exists (step S1113).

Specifically, the request accepting unit 132 decides whether or not a record exists in which the names of a database 121 and an append-only resource 141 included in the differential transfer request of the time-series differential type are stored in the fields of database name 402 and resource name 403.

If an append-only resource 141 by the request does not exist, the request accepting unit 132 notifies the second system 102 of an error (step S1114). Then, the request accepting unit 132 transits into the state of awaiting a request.

If an append-only resource 141 by the request exists, the request accepting unit 132 sends the differential transfer request of the time-series differential type to the request transfer control unit 131 (step S1115).

Upon receiving appropriate data from the request transfer control unit 131, the request accepting unit 132 sends that data to the second system 102 (step S1116). Then, the request accepting unit 132 transits into the state of awaiting a request.

Note that the order in which the steps S1102, S1105, S1108, and S1111 are to be executed may be changed.

Figure 12:
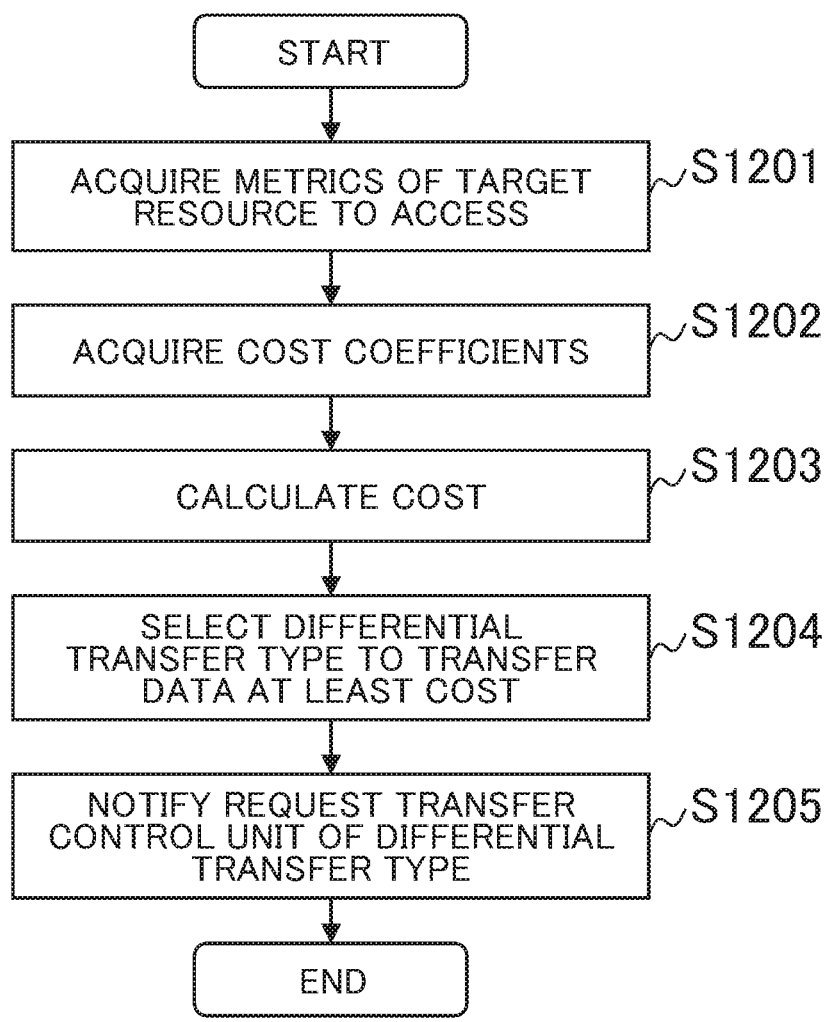
FIG. 12 is a flowchart illustrating an example of processing that is executed by a cost calculation unit in the first embodiment.

FIG. 12 is a flowchart illustrating an example of processing that is executed by the cost calculation unit 133 in the first embodiment.

Upon receiving a query of a data transfer scheme from the request accepting unit 132, the cost calculation unit 133 starts processing described below.

The cost calculation unit 133 identifies a target resource to access by the names of a database 121 and a resource included in the query of a data transfer scheme and acquires metrics of the target resource to access (step S1201).

The metrics of the resource is information for estimating the cost of transferring data; data amount and the number of records are acquired as the metrics in the present embodiment.

Then, the cost calculation unit 133 acquires cost coefficients associated with the target resource to access from the cost coefficient information 123 (step S1202).

Specifically, the cost calculation unit 133 searches for records in which the names of a database 121 and an append-only resource 141 included in the query of a data transfer scheme are stored in the fields of database name 502 and resource name 503. The cost calculation unit 133 acquires values set in the field of cost coefficient 505 in the records searched out.

Then, the cost calculation unit 133 calculates the cost of transferring data with respect to each data transfer scheme using the metrics and the cost coefficients (step S1203). A cost calculation algorithm will be described later.

Next, the cost calculation unit 133 selects a data transfer scheme to transfer data at the least cost (step S1204) and notifies the request transfer control unit 131 of the selected data transfer scheme (step S1205). Then, the cost calculation unit 133 terminates the processing.

Here, a concrete cost calculation algorithm is described. The target resource to access is assumed to be "cnc_1" that is stored in the first database 121-1. The metrics of the target resource to access are assumed to be 10 GB, 2G Record. Also, cost coefficient information 123 is assumed to be that as presented in FIG. 5.

At step S1202, values are acquired from the field of cost coefficient 505 in the records whose ID 501 are "1" and "2". That is, cost coefficients for each of the time-series differential type and the chunk type are acquired.

At step S1203, the cost calculation unit 133 calculates the cost of transferring data by the data transfer scheme of the time-series differential type and the cost of transferring data by the data transfer scheme of the chunk type. The cost of transferring data by the data transfer scheme of the time-series differential type is, for example, calculated as in Formula (3) and the cost of transferring data by the data transfer scheme of the chunk type is, for example, calculated as in Formula (4).

[Formula 3]

$$10 \text{ GB} * 4/B + 2G \text{ record} * 9/\text{record} = 58 \text{ GB} \quad (3)$$

[Formula 4]

$$10 \text{ GB} * 10/B + 2G \text{ record} * 1/\text{record} = 102 \text{ GB} \quad (4)$$

At step S1204, the cost calculation unit 133 decides that the time-series differential type uses less resource amount than the chunk type and selects the time-series differential type.

Figure 13:
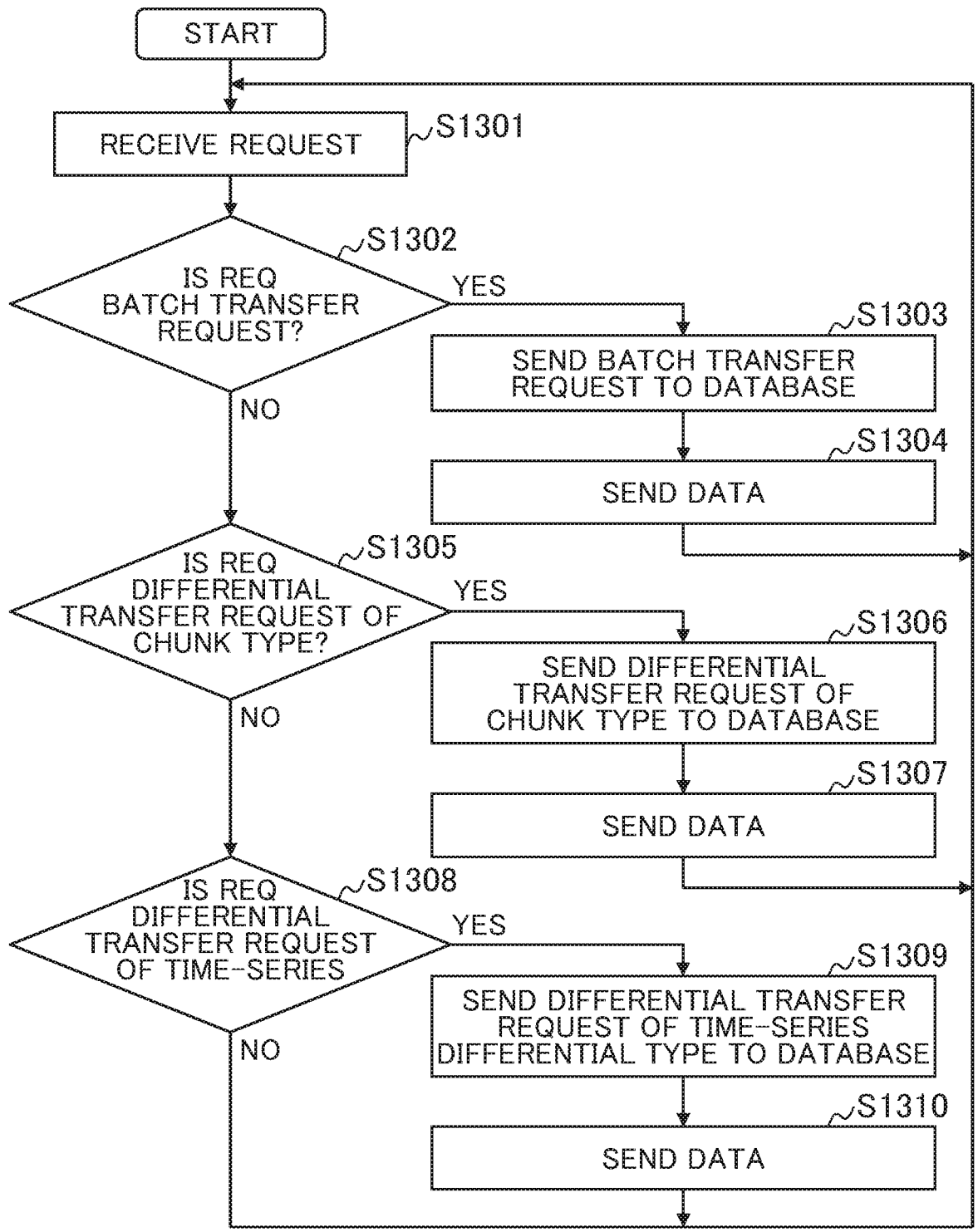
FIG. 13 is a flowchart illustrating an example of processing that is executed by a request transfer control unit in the first embodiment.

FIG. 13 is a flowchart illustrating an example of processing that is executed by the request transfer control unit 131 in the first embodiment.

The request transfer control unit 131 in a state of awaiting a request, upon receiving a request from the request accepting unit 132 (step S1301), then decides whether or not the request is a batch transfer request (step S1302).

If the received request is a batch transfer request, the request transfer control unit 131 sends the batch transfer request to an appropriate database 121 matched with the name of a database included in the request (step S1303).

Upon receiving appropriate data from the database 121, the request transfer control unit 131 sends that data to the request accepting unit 132 (step S1304). Then, the request transfer control unit 131 transits into the state of awaiting a request.

If it is decided at step S1302 that the received request is not a batch transfer request, the request transfer control unit 131 decides whether or not the received request is a differential transfer request of the chunk type (step S1305).

If the received request is a differential transfer request of the chunk type, the request transfer control unit 131 sends the differential transfer request of the chunk type to an appropriate database 121 matched with the name of a database 121 included in the request (step S1306).

Upon receiving appropriate data from the database 121, the request transfer control unit 131 sends that data to the request accepting unit 132 (step S1307). Then, the request transfer control unit 131 transits into the state of awaiting a request.

Note that, if sending of the differential transfer request of the chunk type for a non-existent chunk occurs at step S1306, the database 121 notifies the request transfer control unit 131 of an error. In this case, an error notification is sent instead of the data at step S1307.

If it is decided at step S1305 that the received request is not a differential transfer request of the chunk type, the request transfer control unit 131 decides whether or not the received request is a differential transfer request of the time-series differential type (step S1308).

If it is decided that the received request is not a differential transfer request of the time-series differential type, the request transfer control unit 131 transits into the state of awaiting a request.

If the received request is a differential transfer request of the time-series differential type, the request transfer control unit 131 sends the differential transfer request of the time-series differential type to an appropriate database 121 matched with the name of a database 121 included in the request (step S1309).

Upon receiving appropriate data from the database 121, the request transfer control unit 131 sends that data to the request accepting unit 132 (step S1310). Then, the request transfer control unit 131 transits into the state of awaiting a request.

Figure 14:
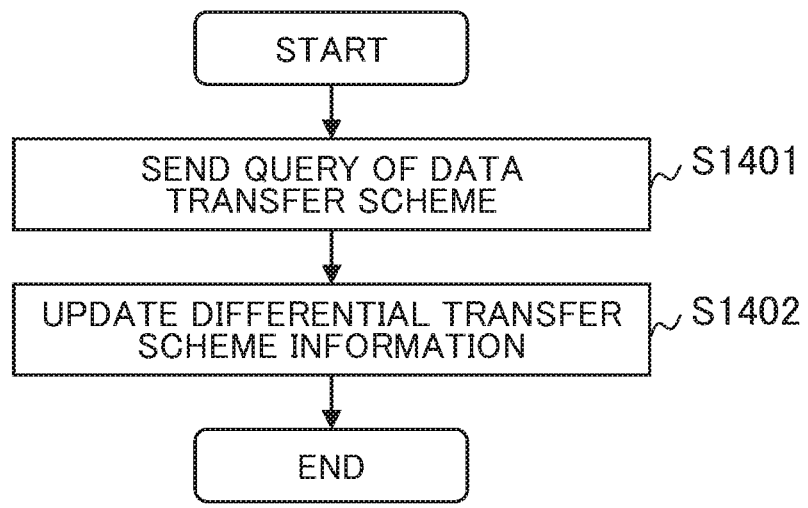
FIG. 14 is a flowchart illustrating an example of processing that is executed by the data acquisition module in the first embodiment.
Figure 15:
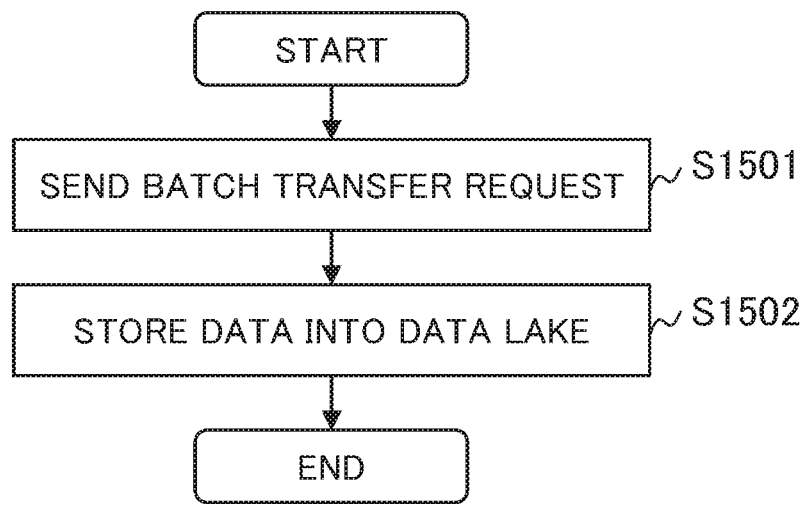
FIG. 15 is a flowchart illustrating an example of processing that is executed by the data acquisition module in the first embodiment.
Figure 16:
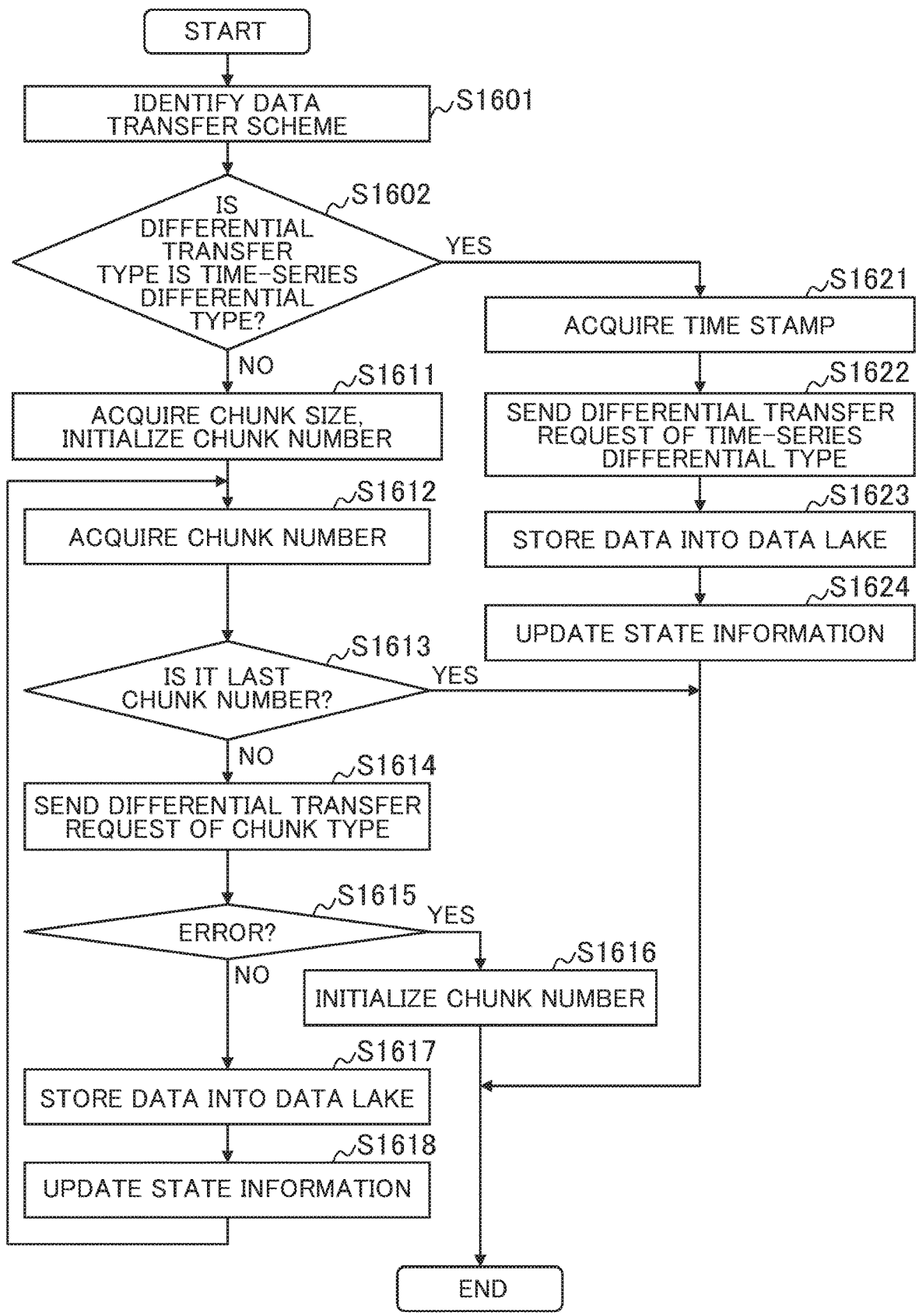
FIG. 16 is a flowchart illustrating an example of processing that is executed by the data acquisition module in the first embodiment.

FIG. 14, FIG. 15, and FIG. 16 are flowcharts illustrating an example of processing that is executed by the data acquisition module 151 in the first embodiment.

FIG. 14 is a flowchart illustrating processing that is executed when querying about a data transfer scheme for a resource. The data acquisition module 151 starts processing as described below by a command from a user.

The data acquisition module 151 sends a query of a data transfer scheme for a target resource to access to the API providing module 112 (step S1401).

Upon receiving from the API providing module 112 a response including information indicating an appropriate data transfer scheme, the data acquisition module 151 updates the differential transfer scheme information 154 (step S1402). Then, the data acquisition module 151 terminates the processing.

To the differential transfer scheme information 154, for example, the data acquisition module 151 adds data that is comprised of the name of a database 121, the name of a resource, and the relevant data transfer scheme.

At this time, the data acquisition module 151 determines a value to be stored in the state information 153, depending on the determined data transfer scheme. For instance, if the data transfer scheme is "chunk type", chunk size and a chunk number are determined as values to be stored in the state information 153. If the data transfer scheme is "time-series differential type", a time stamp is determined as a value to be stored in the state information 153.

FIG. 15 is a flowchart illustrating processing that is executed when accessing the target resource to access for the first time. The data acquisition module 151 starts processing as described below by a command from a user.

The data acquisition module 151 sends a batch transfer request to the API providing module 112 (step S1501).

Upon receiving appropriate data from the API providing module 112, the data acquisition module 151 stores the received data into the data lake 155 (step S1502). Then, the data acquisition module 151 terminates the processing.

FIG. 16 is a flowchart illustrating processing that is executed when accessing the target resource to access for the second and subsequent times. The data acquisition module 151 starts processing as described below by a command from a user.

The data acquisition module 151 refers to the differential transfer scheme information 154 and identifies the data transfer scheme for the target resource to access (step S1601).

Then, the data acquisition module 151 decides whether or not the data transfer scheme is the time-series differential type (step S1602).

If the data transfer scheme is the time-series differential type, the data acquisition module 151 acquires an appropriate time stamp 601 from the state information 153 (step S1621).

Next, the data acquisition module 151 sends a differential transfer request of the time-series differential type including the name of a database 121, the name of a resource, and the time stamp 601 to the request accepting unit 132 (step S1622).

Upon receiving appropriate data from the request accepting unit 132, the data acquisition module 151 stores the received data into the data lake 155 (step S1623) and updates the time stamp 601 in the state information 153 (step S1624). Then, the data acquisition module 151 terminates the processing.

If it is decided at step S1602 that the data transfer scheme is not the time-series differential type, that is, the data transfer scheme is the chunk type, the data acquisition module 151 acquires the chunk size and initializes the chunk number (step S1611).

If the chunk size does not exist, the chunk size is set according to initial setting by user. Besides, 1 is set as the chunk number. The data acquisition module 151 sets appropriate values in the fields of chunk size 602 and chunk number 603 in the state information 153.

Then, the data acquisition module 151 acquires a chunk number 603 in the state information 153 (step S1612) and decides whether or not it is the last chunk number (step S1613).

If it is the last chunk number, the data acquisition module 151 terminates the processing.

If it is not the last chunk number, the data acquisition module 151 sends a differential transfer request of the chunk type including the name of a database 121, the name of a resource, chunk size, and the chunk number to the request accepting unit 132 (step S1614).

Upon receiving a response from the request accepting unit 132, the data acquisition module 151 decides whether or not the received response is an error notification response (step S1615).

If the received response is an error notification response, the data acquisition module 151 initializes the chunk number 603 in the state information 153 (step S1616). Then, the data acquisition module 151 terminates the processing.

If the received response is not an error notification response, i.e., it is a response including appropriate data, the data acquisition module 151 stores that data into the data lake (S1617) and updates the chunk number 603 in the state information 153 (step S1618). Specifically, the current value of the chunk number 603 incremented by 1 is stored in the field of chunk number 603. Then, the data acquisition module 151 returns to step S1612 and executes the same processing.

According to the first embodiment, the API providing module 112 (in the first system 101) selects a data transfer scheme to transfer data with less processing load and notifies the data acquisition module 151 (in a second system 102) of the data transfer scheme.

The data acquisition module 151 acquires data from a resource stored in a database 121 according to the notified data transfer scheme. Thereby, it is possible to reduce influence on the operations running on the first system 101. Besides, because there is no interruption of data transfer between the first system 101 and a second system, it is possible to speed up data transfer between the systems.

Besides, the data acquisition module 151 determines information to be managed as a state, based on the notified data transfer scheme, and performs state management. Thereby, because memory usage for data transfer in the first system 101 can be saved, it is possible to reduce influence on the operations running on the first system 101.

Second Embodiment

In a second embodiment, multiple manners of control are provided to control data access for the first time. The following description focuses on difference from the first embodiment.

The computer system configuration in the second embodiment is the same as that in the first embodiment. The configurations of the first system 101 and a second system 102 in the second embodiment are the same as those in the first embodiment. In the second embodiment, however, the first system 101 retains setup information 1700 as is presented in FIG. 17.

FIG. 17 is a diagram to explain the setup information 1700 that is retained by the first system 101 in the second embodiment.

As the setup information 1700, manners of control of data access for the first time are set. In particular, there manner of control are defined: no restriction, slow, and deny.

A manner of control, no restriction, is to allow for batch transfer free of restriction. A manner of control, slow, is to transfer batch data in small amounts depending on the load of the first system. A manner of control, deny, is to ban batch transfer.

A user can set in advance any manner of control on the API providing module 112.

If a manner of control, slow, was set, the request accepting unit 132 accepts a batch transfer request. The request transfer control unit 131 sends data segmented in units of chunks without carrying out batch transfer. At this time, the request transfer control unit 131 adjusts the amount of data to be transferred depending on the load of the first system 101. Thereby, control can be exerted to transfer data only when the load of the first system is low.

If a manner of control, deny, was set, control is exerted so that the request accepting unit 132 will not accept a batch transfer request in principle. However, control is exerted so that the request accepting unit 132 will accept an API description 803 that calls for a forcible batch transfer. Thereby, it is possible to avoid an unplanned batch transfer mainly because of user's mistake or carelessness.

Note that the present invention is not limited to the embodiments described hereinbefore and various modifications are included therein. Besides, for example, the foregoing embodiments are those in which a configuration was described in detail to explain the present invention clearly and the invention is not necessarily limited to those including all components described. Besides, for a subset of the components of each embodiment, the subset may be added to another configuration or the subset may be removed or replaced by other components.

Besides, a subset or all of the aforementioned components, functions, processing units, processing means, etc. may be implemented by hardware; for example, by designing an integrated circuit to implement them. Besides, the present invention may be implemented by program code of software that implements functionality of an embodiment. In this case, a storage medium in which the program code was recorded is provided to a computer and a processor present in the computer reads the program code stored in the storage medium. In this case, the program code itself that was read from the storage medium implements the functionality of the foregoing embodiment and the program code itself and the storage medium storing it constitute the present invention. As a storage medium for supplying such program code, for example, a flexible disk, CD-ROM, DVD-ROM, hard disk, Solid State Drive (SSD), optical disk, magnetic optical disk, CD-R, magnetic tape, non-volatile memory car, ROM, etc. may be used.

Besides, program code that implements functionality described in an embodiment set forth herein may be implemented by a wide variety of programs or script languages, such as, e.g., assembler, C/C++, perl, Shell, PHP, Python, and Java (a registered trademark).

Furthermore, by delivering program code that implements functionality of an embodiment via a network, the program code may be stored in a storage means of a computer, such as a hard disk or memory, or a storage medium, such as CR-RW or CD-R. A processor present in the computer may read and execute the program code stored in the storage means or the storage medium.

In the foregoing embodiments, control lines and information lines that are considered as necessary for explanation are delineated and all control lines and information lines involved in a product are not necessarily delineated. All components may be interconnected.

What is claimed is:

1. A computer system adapted to control data transfer between multiple systems comprising computers, each having an arithmetic unit, a storage device being connected to the arithmetic unit, and a networking device being connected to the arithmetic unit;
   the multiple systems including a first system that performs operations and a second system that acquires data regarding the operations,
   the first system comprising a storage unit that manages resources storing the data and a control unit that controls transfer of the data to the second system based on any one of multiple data transfer schemes,
   the second system comprising a data acquisition unit that acquires the data from the resources,
   wherein the control unit,
   upon accepting a query of a data transfer scheme for a target resource from the data acquisition unit, calculates cost that represents a load of the first system with respect to each of the multiple data transfer schemes,
   determines an applicable data transfer scheme based on the cost, and
   sends information on the determined data transfer scheme to the second system,
   wherein the data acquisition unit;
   manages states that are information for managing a data transfer state and for use in data transfer based on the determined data transfer scheme, and
   sends a request to acquire the data from the resources based on the determined data transfer scheme and the states,
   wherein the first system manages cost coefficient information for managing cost coefficients for use in calculating the cost with respect to each of the data transfer schemes,
   wherein the control unit:
   acquires metrics of the target resource for use to calculate the cost,
   acquires the cost coefficients for each of the multiple data transfer schemes from the cost coefficient information, and
   calculates the cost with respect to each of the multiple data transfer schemes based on the metrics and the cost coefficients for each of the multiple data transfer schemes.

2. The computer system according to claim 1, wherein the data acquisition unit determines a value that is managed as the states based on the determined data transfer scheme.

3. The computer system according to claim 1, wherein the metrics of the target resource are at least either of the number of pieces of the data being stored in the resource and the data amount in the resource.

4. The computer system according to claim 1, wherein:
   the storage unit stores multiple types of resources for which formats of storing data differ by type; and
   the cost coefficient information stores records, each comprising the resource type, the data transfer scheme, and the cost coefficients.

5. The computer system according to claim 1, wherein the control unit, upon receiving a batch transfer request for the target resource from the data acquisition unit, adjusts the data amount to be transferred depending on the load of the first system and sends the data in the target resource to the second system.

6. A control method for data transfer between multiple systems that run in a computer system,
   the computer system comprising computers, each having an arithmetic unit, a storage device being connected to the arithmetic unit, and a networking device being connected to the arithmetic unit;
   the multiple systems including a first system that performs operations and a second system that acquires data regarding the operations,
   the first system comprising a storage unit that manages resources storing the data and a control unit that controls transfer of the data to the second system based on any one of multiple data transfer schemes,
   the second system comprising a data acquisition unit that acquires the data from the resources,
   the transfer method for data transfer comprising:
   a first step in which the control unit, upon accepting a query of a data transfer scheme for a target resource from the data acquisition unit, calculates cost that represents a load of the first system with respect to each of the multiple data transfer schemes;
   a second step in which the control unit determines an applicable data transfer scheme based on the cost;

a third step in which the control unit sends information on the determined data transfer scheme to the second system, a fourth step in which the data acquisition unit manages states that are information for managing a data transfer state and for use in data transfer based on the determined data transfer scheme; and a fifth step in which the data acquisition unit sends a request to acquire the data from the resources based on the determined data transfer scheme and the states, wherein:

the first system manages cost coefficient information for managing cost coefficients for use in calculating the cost with respect to each of the data transfer schemes; and the first step comprises:

a step in which the control unit acquires metrics of the target resource for use to calculate the cost, a step in which the control unit acquires the cost coefficients for each of the multiple data transfer schemes from the cost coefficient information, and a step in which the control unit calculates the cost with respect to each of the multiple data transfer schemes based on the metrics and the cost coefficients for each of the multiple data transfer schemes.

7. The control method for data transfer according to claim 6, wherein the fourth step comprises a step in which the data acquisition unit determines a value that is managed as the states based on the determined data transfer scheme.

8. The control method for data transfer according to claim 6, wherein the metrics of the target resource are at least either of the number of pieces of the data being stored in the resource and the data amount in the resource.

9. The control method for data transfer according to claim 6, wherein:

the storage unit stores multiple types of resources for which formats of storing data differ by type; and the cost coefficient information stores records, each comprising the resource type, the data transfer scheme, and the cost coefficients.

10. The control method for data transfer according to claim 6, wherein the method further comprises a step in which the control unit, upon receiving a batch transfer request for the target resource from the data acquisition unit, adjusts the data amount to be transferred depending on the load of the first system and sends the data in the target resource to the second system.

* * * * *